No. 623,043. Patented Apr. 11, 1899.
H. E. SHAFFER.
ACETYLENE GAS BURNER.
(Application filed Dec. 17, 1897.)
(No Model.)
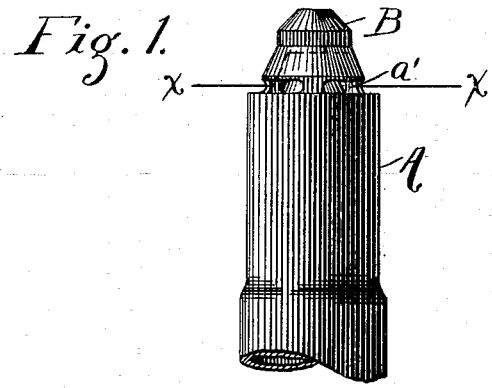
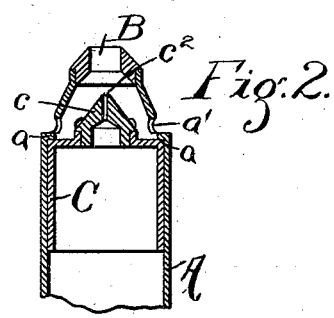
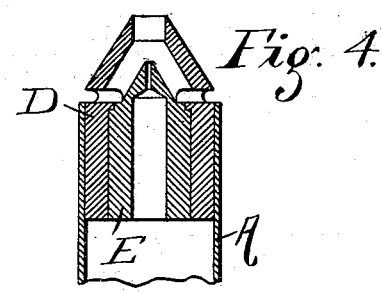
Witnesses.
Chas. F Logan
Grace A Roda
Inventor.
Henry E. Shaffer
by Church & Church
his Attorneys

UNITED STATES PATENT OFFICE.

HENRY E. SHAFFER, OF ROCHESTER, NEW YORK.

ACETYLENE-GAS BURNER.

SPECIFICATION forming part of Letters Patent No. 623,043, dated April 11, 1899.

Application filed December 17, 1897. Serial No. 662,307. (No model.)

*To all whom it may concern:*

Be it known that I, HENRY E. SHAFFER, of Rochester, in the county of Monroe and State of New York, have invented certain new and useful Improvements in Acetylene-Gas Burners; and I do hereby declare the following to be a full, clear, and exact description of the same, reference being had to the accompanying drawings, forming a part of this specification, and to the reference-letters marked thereon.

My present invention relates to burners for rich gases, and particularly for acetylene gas, and has for its object to improve their construction and operation, whereby not only is the gas burned with a clear and even flame, but the burner itself will not become clogged with the deposits that ordinarily interfere with the proper burning of acetylene gas; and to these ends it consists in certain improvements hereinafter described, the novel features being pointed out particularly in the claims at the end of this specification.

In the drawings, Figure 1 is a side elevation of a tip or burner embodying my improvements; Fig. 2, a longitudinal sectional view of the same; Fig. 3, a horizontal sectional view on the line $xx$ of Fig. 1, and Fig. 4 a sectional view of a modification.

Similar reference-letters indicate similar parts.

In carrying out my invention I provide an outer burner casing or shell A, preferably of sheet metal and adapted to be fitted to the inlet or gas pipe after the manner of an ordinary burner, said casing preferably tapering toward the top and having secured in its upper end a conical tip B, of some refractory material, as lava, soapstone, &c., provided with a cylindrical central aperture. This casing A is provided with an internal shoulder $a$ and just above this with a series of laterally-extending apertures $a'$, the portions of the shell between such apertures being just sufficient to properly support the upper part of the shell and offering as small an obstruction to air entering the upper part of the casing as possible.

Secured within the casing A is an interior shell C, preferably of sheet metal and having near the upper portion an annular shoulder arranged when the shell is thrust into the casing to engage the shoulder $a$ thereon to properly position the parts. The upper part of the shell C is provided with a central aperture adapted to receive and hold a small conical jet-tube C, preferably of lava, soapstone, or other refractory material and having the small central gas-aperture $c^2$ at the apex, as shown. The upper end of this conical tip or jet-tube $c$ is arranged above the lateral openings in the casing A, and there is a free entry of air into the casing, which comes in contact with every portion of the inside of said outside cone before discharging at the burning-point, and the inside jet-tube, having a small opening at its apex directly under the discharge-opening of the outside cone, is also entirely surrounded by air. The air thus surrounding both these cones—the one on the inside and the other on the outside—forms a complete cone-shaped air-chamber or reservoir of air. When the gas is turned on to be lighted, it rises under pressure to the outlet in the outside shell directly above through the upper part of this air-chamber, and in doing so it sets all the air in this chamber in an upward motion. The distance from the outlet of gas and the point above where it discharges and burns in the open air is so short that with the equal pressure of air entirely surrounding the gas on every side in its upward motion none of the gas penetrates laterally through the air column until after passing through the upper conical tip. Air being of a greater density than acetylene gas also helps to keep acetylene in its place between walls of air traveling in the same direction for so short a space. This arrangement keeps the jet-tube, but more particularly the tip B, very cool and absolutely prevents the clogging of the small jet-aperture and the conical tip B by the deposit usually formed when acetylene gas is brought into contact with a hot surface, and the large radiating-surface formed prevents conducting and retaining the heat.

It will be understood that, if desired, the tip and outer casing could be made of a single piece of lava or other refractory material D, and also that the interior jet-tube and internal shell E could be similarly formed in a single piece of refractory material, as shown in section in Fig. 4; but I much prefer the employment of the metal shells, as described, as the burner is materially cheapened and lightened.

Burners constructed as shown may be used separately, if desired, or the flames from two burners arranged at an angle may be caused to combine and produce a flat flame in a manner well known to those skilled in the art.

I claim as my invention—

1. In an acetylene-gas burner, the combination with the outer shell or casing having the central burner-tip aperture open to the external air without obstruction at the top and open at the sides immediately below said aperture to form an air-chamber freely supplied with cool air, of the jet-tube having the small gas-aperture arranged centrally of and directly beneath the central opening of the shell, the distance between the apertures being sufficient to cause a partial admixture of gas and air, but whereby the jet of partially-mixed air and gas will pass directly through and be enveloped by a stream of cool air during its passage through the central aperture.

2. In an acetylene-gas burner, the combination with the outer casing having the circular aperture at the top, freely open to the air and an air-chamber immediately beneath said aperture and open laterally to the air, of a cylindrical jet-tube having a circular gas-aperture arranged centrally beneath said casing-aperture and isolated from the casing above the inlet to the air-chamber, the distance between the circular apertures being sufficient to cause a partial admixture of the gas and air before its escape.

3. In an acetylene-gas burner, the combination with the outer shell or casing having the lateral apertures and the cylindrical tip of refractory material at its upper end freely open to the air, of the internal shell, the jet-tube of refractory material in the shell, having the perforated upper end arranged centrally and directly beneath the tip and projecting above the lateral apertures in and isolated from the walls of the casing above said lateral apertures, the arrangement of the escape-apertures being such as to cause a partial admixture of gas and air before its final escape, substantially as described.

4. In an acetylene-gas burner, the combination with the outer casing having the cylindrical aperture at the upper end open to the air, and the lateral apertures below it, of the shell fitting within the casing, having the cylindrical jet-tube arranged centrally and directly beneath the upper aperture in the outer casing and isolated from the walls thereof above the lateral apertures, the arrangement of the escape-apertures being such as to cause a partial admixture of gas and air before its final escape.

HENRY E. SHAFFER.

Witnesses:
 F. F. CHURCH,
 G. A. RODA.